United States Patent [19]

Mononen

[11] 4,239,067
[45] Dec. 16, 1980

[54] APPARATUS FOR BULK-LOPPING, BUCKING AND PRESTACKING IN FOREST HARVESTING

[75] Inventor: Sakari Mononen, Nurmijärvi, Finland

[73] Assignee: Finncombi Sakari Mononen Ky, Finland

[21] Appl. No.: 970,178

[22] Filed: Dec. 18, 1978

[30] Foreign Application Priority Data

Dec. 21, 1977 [FI] Finland ................................ 773887

[51] Int. Cl.³ ........................ B27L 1/00; A01G 23/08
[52] U.S. Cl. .................................. 144/2 Z; 144/246 F; 144/309 AC
[58] Field of Search .................... 144/2 Z, 3 D, 34 R, 144/34 E, 246 R, 246 F, 309 AC

[56] References Cited

U.S. PATENT DOCUMENTS

| | | | |
|---|---|---|---|
| 3,500,883 | 3/1970 | Herlof et al. | 144/2 Z |
| 3,529,639 | 9/1970 | Herolf | 144/2 Z |
| 3,542,099 | 11/1970 | Gibson | 144/3 D |
| 3,797,539 | 3/1974 | Moser et al. | 144/2 Z |
| 3,797,541 | 3/1974 | Kurelek et al. | 144/3 D |
| 4,083,463 | 4/1978 | Ericsson | 144/3 D |

FOREIGN PATENT DOCUMENTS 2547033  4/1977  Fed. Rep. of Germany ......... 144/2 Z
2811660  3/1978  Fed. Rep. of Germany ......... 144/2 Z Primary Examiner—W. Donald Bray
Attorney, Agent, or Firm—Steinberg & Raskin

[57] ABSTRACT

Apparatus adapted to be connected to the free end of a boom carried by an appropriate vehicle for bulk lopping of trees, such for example as during forest thinning and for substantially simultaneous bucking and prestacking thereof. The apparatus includes a frame adapted to be connected to the boom, at least one pair of lifting and lopping arms pivotally mounted to respective elongate pivot members of the frame, the arms extending downwardly in an open position and movable inwardly to a closed position for engaging and suitably locating the trunks of the trees therebetween. Structure for feeding tree trunks through the apparatus include roll units fixed to the frame as well as roll units movably mounted on the frame, the latter being movable between a first open position for receiving the tree trunks engaged by the lifting and lopping arms and a second closed position defining an adjustable feeding pocket. The lifting and locking arms and movable roller units are interconnected so that their respective movements between open and closed positions are effected substantially simultaneously. Lopping blades are provided on the arms for lopping the trunks as the latter are fed through the apparatus under the action of the feed roll units.

11 Claims, 3 Drawing Figures

APPARATUS FOR BULK-LOPPING, BUCKING AND PRESTACKING IN FOREST HARVESTING

BACKGROUND OF THE INVENTION

This invention relates generally to forest thinning apparatus and, more particularly, to apparatus for bulk-lopping a plurality of felled trees and bucking and prestacking the same, all substantially simultaneously, and without the necessity for substantial human intervention.

In general, it can be said that no accepted mechanical solution has been devised for thinning a cultivated forest in a substantially mechanized or automated manner. Therefore, for the most part, the thinning of a forest generally necessitates and is accomplished utilizing a significant amount of heavy physical labor, such as that required during prestacking of the logs.

Of course, tree harvesting apparatus are known which generally include a traction device including a pair of juxtaposed feeding rolls between which the trunks of the felled trees are fed. Such apparatus is further provided with fixed lopping and bucking devices. Such conventional tree harvesters are not entirely satisfactory, however, in that the particular two-component trunk feeding mechanisms are capable of feeding only a single trunk at a time. In other words, a smaller diameter trunk which might be located adjacent to a larger one which is to be engaged by and fed between the pair of fixed feeding rolls, cannot be additionally accommodated between and gripped by the pair of feeding rollers. Thus, to the extent that it has been found necessary to be able to process several trees simultaneously to obtain maximum efficiency, these conventional tree harvesters have not been found satisfactory. Further, although tree harvesters are known in which four pulling or feeding rolls are permanently affixed to the machine frame, it is not possible with such structure to engage a felled tree or trees to lift the same into the lopping mechanism, even should such a harvester having four pulling rolls be attached to the free end of a movable boom.

SUMMARY OF THE INVENTION

Accordingly, one object of the present invention is to provide a new and improved apparatus for bulk-lopping, i.e., lopping a plurality of felled trees at one time, and for bucking and prestacking the same, in a more efficient manner than was possible utilizing prior devices.

Another object of the present invention is to provide a new and improved tree harvester which can engage several felled trees lying on the ground, lift the same and thereafter perform bulklopping thereon and, when necessary, prestacking thereof.

Still another object of the present invention is to provide a new and improved tree harvesting device which is adapted to be easily and economically connected to the free end of a boom which may be carried by a forest tractor or excavator and which are conventionally equipped with loading scoops, log loaders or the like.

Yet another object of the present invention is to provide a new and improved tree harvester which is operable with a smaller carrying machine or vehicle.

Yet still another object of the present invention is to provide a tree harvesting apparatus capable of processing several trees concurrently so that processing of small-diameter logs from initial thinning is economically efficient.

Briefly, in accordance with the present invention, these and other objects are attained by providing apparatus including a frame structure adapted to be affixed to the free end of a boom whose other end is connected to a conventional basic vehicle which forms no part of the present invention, but which is adapted to ride over the particular terrain where the forest to be thinned is located. Mounted on the frame structure are various machine components for both feeding and lopping the tree trunks. Thus, the apparatus further includes at least one pair of combined lifting and lopping arms pivotally mounted at their upper end regions to associated frame elements, the arms being movable toward each other to engage a plurality of felled trees between them and lift the same into a feed pocket as described below. The apparatus further includes a log feeding structure including at least two roller units pivotally mounted to the frame structure and a counter roller unit or units, permanently affixed to the frame structure. The movable roller units are movable to a closed position to define together with the fixed or counter roller unit a log feeding pocket which acts on the logs lifted by the lifting and lopping arms to longitudinally move the same past lopping blades, at least some of which are provided on the lifting and lopping arms themselves. In the preferred embodiment disclosed herein, means are provided for actuating the lifting and lopping arms simultaneously with the feed roller units so that the arms engage, grip and lift the tree trunks into the feed pocket defined by the feed roller units concurrently with the movable feed roller units moving to their closed position to define the feeding pocket which moves the tree trunks past the lopping blades provided on the arms.

The tree harvesting apparatus of the present invention provides several important advantages relative to currently existing harvesting devices. Thus, the present invention is capable of handling trees which cannot be conveyed to the harvesting trail in their entirety from the forest which is being thinned. The trees to be processed are initially gripped or engaged by the same machine components as subsequently accomplish the lopping of the trees. This allows for advantageous simplification of the construction as well as the operation of the apparatus. During operation of the apparatus of the present invention, the trees being processed are concurrently machined and transported while the trees are fed through the apparatus. For this reason, the apparatus of the present invention requires only a minimum of operational space since no space is required at the opposite side of the machine, when viewed in the working direction, and the apparatus can therefore process the trees in either longitudinal direction. This is important, especially in dense forest stands that are to be thinned and, additionally, result in a minimization of damage to the forest during harvesting operations.

DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
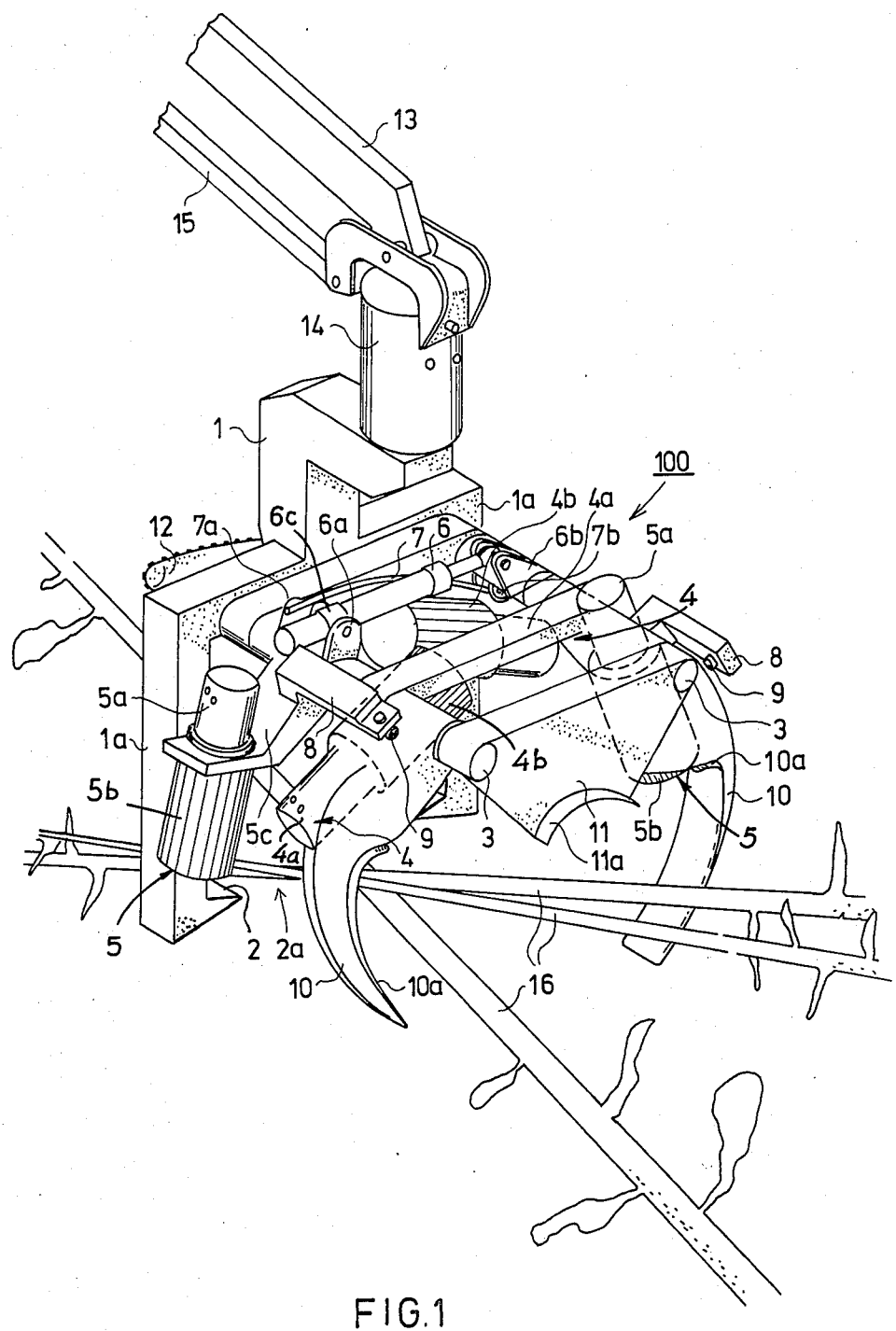
FIG. 1 is a perspective view of the apparatus of the present invention schematically illustrating the same with the lifting and lopping arms open and receiving several felled tree trunks.

Referring now to the drawings wherein the like reference characters designate identical or corresponding parts throughout the several views, the bulk-lopping, bucking and prestacking apparatus of the present invention, generally designated 100, is advantageously provided on the free end of a boom, described below, in the place, for example, of a grab of a log loader of a forest tractor or the scoop of a similar terrain vehicle, such as a tractor digger or an excavator. Apparatus 100 includes a frame 1 having a substantially inverted U-shaped configuration including a pair of downwardly depending legs 1a, the lower terminal end regions thereof being provided with inwardly directed barb-like tongues 2 (FIGS. 1 and 2) which define a reduced throat area 2a forming the entrance to a collecting pocket 17 defined between legs 1a.

Extending perpendicularly from the plane of the frame 1 from the regions thereof where the depending legs 1a join the crossmember, and forming a part of the frame member, are a pair of parallelly extending, elongate rod-like pivot members 3 on which the feed roll units and lifting and lopping arms are mounted as described below. The feed roll units act to pull the logs being processed through the apparatus past the lopping blades. As described below, the feed roll units are designed to provide a variable area feed pocket which can accommodate and pull a plurality of logs without setting up any torsion in the logs.

Figure 3:
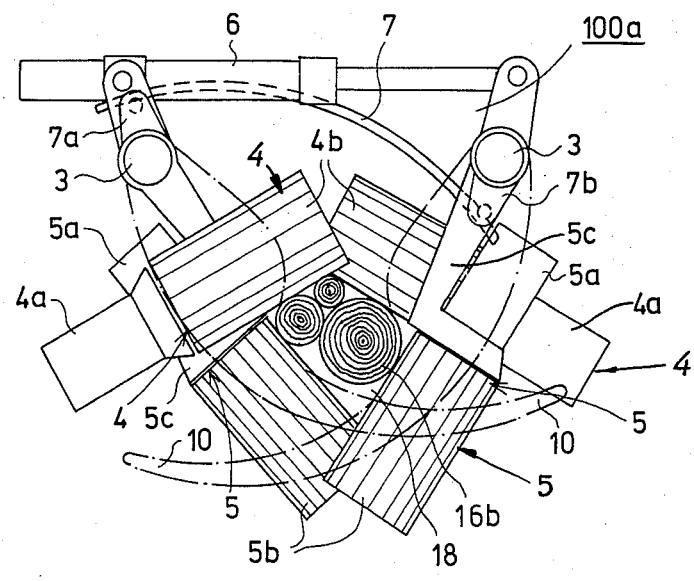
FIG. 3 is a front view of the feeding roller units of the present invention while in their closed configuration defining the lopping or feed pocket thereof and also illustrating, in phantom lines, the lifting the lopping arms in their closed position.

Thus, in the present embodiment, a roll unit 4 is rigidly fixed on each of the elongate pivot members 3. Each of the fixed feed roll units 4 consist of a motor drive unit 4a and a feed roller 4b. As best seen in FIGS. 1 and 3, the fixed feed roll units are longitudinally juxtaposed with respect to each other, i.e., one of the roll units 4 is located longitudinally behind the other of the roll units, with the axis of rotation of the feed rollers 4b upwardly converging and, further, with the free end regions of the rollers 4b overlapping each other in the longitudinal direction.

A pair of feed roll units 5, each comprising a motor drive unit 5a and a feed roller 5b, are mounted on the frame 1, each of the feed roll units 5 being pivotally mounted on a corresponding pivot member 3. Again, as best seen in FIGS. 1 and 3, the pivotally mounted feed roll units 5 are longitudinally juxtaposed with respect to each other in a manner whereby upon pivoting the pivotal feed roll units 5 to their closed position as described below, each such pivotal feed roll unit 5 mounted on a pivot member 3 will be located in substantially opposed relationship to a corresponding fixed feed roll unit 4 mounted on the other one of the pivot members 3. Thus, two longitudinally adjacent pairs of feed rollers 4b, 5b, are provided, each pair of feed rollers 4b, 5b, being in opposed relationship to each other upon the feed roll units 5 being pivoted to their closed position. The feed rollers 5b run opposite to the feed rollers 4b and by virtue of the above-described configuration of the feed rollers, no torsion is transmitted to a log which is being pulled through the apparatus.

The pivotal feed roll units 5 are mounted on the pivot members 3 through respective turning arms 5c (FIGS. 1 and 3), each arm 5c having one end in which the feed roll unit 5 is captured and another end journaled over the corresponding pivot members 3. The pair of turning arms 5c are mutually interconnected through a twinacting hydraulic piston-cylinder arrangement 6, one end of the cylinder being connected to one of the arms 5c through a band 6c pivotally mounted within a bifurcated structure 6a provided on one of the arms 5c, while the free end of the piston is rotatably pinned to a bifurcated pivot structure 6b provided on the other of the arms 5c.

A flexible arched bending spring 7 has its terminal end regions fixed, such as by welding, to the pivot pins 7a', 7b' of respective bifurcated pivot structures 7a, 7b mounted on corresponding pivot members 3. Spring 7 functions to consolidate and stabilize the pivotal movement of the feed rollers 5b and lopping arms 10 as described below.

Figure 2:
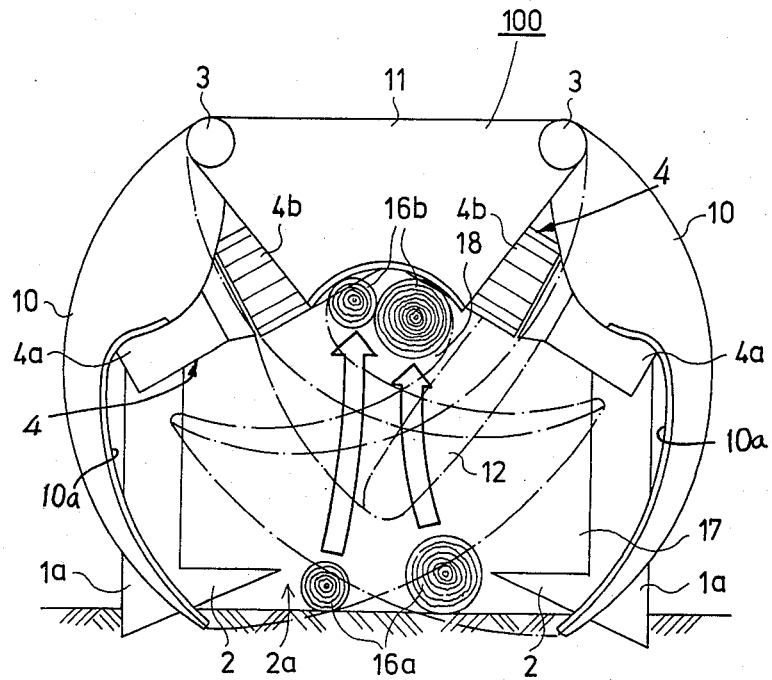
FIG. 2 is a front view of the apparatus illustrated in FIG. 1 illustrating the same with the lifting and lopping arms in their open position, and showing in phantom lines, the lifting and lopping arms in their closed position.

Pivotally mounted to the forward ends of pivot members 3 are a pair of lifting and lopping arms 10. Each of the lifting and lopping arms 10 comprise an arcuately shaped member, the inner convex edge thereof being provided with a lopping blade 10a. Referring to FIG. 2 wherein the lifting and lopping arms 10 are shown in their open position, it is seen that when in this position, the lifting and lopping arms 10 are located outwardly of the collecting pocket 17 defined by the pair of downwardly extending legs 1a of frame 1. The lifting and lopping arms 10 are pivotally movable to a closed position, shown in phantom in FIG. 2, whereby felled trees engaged by the free end portions thereof are lifted from the ground and located within a feed pocket 18 defined by the feed roll units in their closed position as described below in connection with the operation of the device.

The pivotally movable feed roll units 5 and lifting and lopping arms 10 mounted on common pivot members 3 are mutually interconnected for simultaneous pivotal rotation about the respective pivot member 3 by respective brackets 8, each having one end rigidly fixed to a respective turning arm 5c, the other end thereof being connected to a corresponding lifting and lopping arm 10 through a flexible element 9. Thus, the movable feed roll units 5 and the lifting and lopping arms 10 together form a unitarily functioning assembly. More particularly, by suitably introducing hydraulic fluid into the piston-cylinder assembly 6, both the movable feed roller units 5 and the lifting and lopping arms 10 are simultaneously moved from their open position illustrated in FIG. 1 to their closed positions illustrated in FIGS. 2 (in phantom) and 3. Similarly, upon suitable reverse actuation of the piston-cylinder 6, both the movable feed roll units 5 and lifting and lopping arms 10 are movable from their closed to their open configuration.

A blade frame 11 is fixed over the free end regions of the pivot members 3 at the forward end of apparatus 100. An arcuate lopping blade 11a is provided on the lower edge of blade frame 11. The cutting or bucking unit of the tree harvesting unit 100 comprises a chain saw 12 mounted for pivotal movement on the reverse side surface of frame 1. Of course, the cutting unit may comprise any suitable apparatus such, for example, as a circular saw or a hydraulic crushing bench driven by a conventional motor (not shown).

The tree harvesting unit 100 of the present invention is preferably suspended from the free end of a boom 13 whose other end is usually pivotally affixed in a universal manner to a conventional forest terrain vehicle or machine. The connection of the apparatus 100 to the boom 13 is preferably accomplished through a rotatable member 14 which is pinned to the end of the boom for rotation about a horizontal axis, the apparatus 100 being rotatable about member 14 in a vertical axis. Thus, rotatable member 14 may be similar to conventional members utilized for suspending grabs of a log loader from a boom. A stabilizer bar or cylinder 15 may be employed to provide rigidity in the direction of the boom 13.

The operation of the apparatus of the present invention is as follows. Thus, for example, the bulk-lopping, bucking and prestacking apparatus 100 can be advantageously employed in mechanizing the thinning out of stands of saplings in cultivated forests. Thus, a forest tractor or similar terrain vehicle has its boom equipped with the apparatus 100 as described above. The vehicle typically will proceed in reverse along the pre-cleared path formed through the forest. Of course, the trees have been felled in advance of the machine by conventional motor saws or the like. Although the apparatus 100 may be suitably equipped so as to function as a tree feller, this is not always expedient due to the fact that the lateral movement of the apparatus 100 is limited by the length of boom 13. The trees which are distant from the cleared trail are preferably felled toward the trail while those to be cleared from the trail as well as those which line the trail can be felled in any direction at the discretion of the operator.

Apparatus 100 is guided by boom 13 over the trunk 16 of a felled tree in a manner such that the pivot members 3 are directed substantially parallel to the trunk by means of the rotatable device 14. The unit 100 is vertically lowered over the trunk 16 with the lifting and lopping arms 10 as well as the movable feed roll units 5 in their open position. The lifting and lopping arms 10 are then rotated to their closed position through suitable actuation of the hydraulic piston-cylinder assembly 6. Should there be additional, relatively small trees in the approximate area, these can be included for simultaneous lopping and bucking by merely moving apparatus 100 over them in the same manner as aforesaid after engagement with the initial felled tree. It should be noted that during such movement to additional trees, the tongues 2 of throat area 2a prevent the initially collected tree trunks located in collecting pocket 17 from falling therefrom during movement of the apparatus 100.

As shown in FIG. 2, the free end regions of legs 1a of frame 1 are firmly planted on the ground at which time the lifting and lopping arms 10 are moved to their closed position as shown in phantom in FIG. 2. By firmly planting the frame 1 with respect to the ground, it is now possible to advantageously operate the bucking saw 12 while providing sufficient resistance forces to counteract the large forces present from the dragging of the tree trunks and lopping operations described below. Since the apparatus 100 is stationary during operation, sufficient room will be provided for stacking the bucked logs. However, it should be understood that the apparatus 100 can also operate when raised from the ground and that the blades 10a of the lifting and lopping arms 10 can also be used independently for the loading and/or stacking of trunks.

The longitudinal movement of the trunks 16 past the lopping blades 10a is accomplished upon the movable feed roll units 5 moving to their closed position (together with the lifting and lopping blades 10) into opposed relation to the fixed feed roll units 4. Thus, the fixed and movable feed rollers 4b, 5b, under the urging of hydraulic cylinder 6 and the associated bending spring 7, frictionally engage the tree trunks (or single tree) from all four sides with the frictional forces being substantially equally distributed. When in their closed configuration, as seen in FIG. 3, the fixed and movable feed rollers 4b, 5b define a lopping pocket 18 whereupon the traction efficiency or friction of the rollers against the tree trunks is at a maximum. With this configuration, damage to the tree trunks has been found to be less than with any previously known 2-roller constructions. It is noted that when the feed rollers are in their closed configuration the lopping pocket 18 is confined within the space defined by the lopping blades 10a in their closed configuration.

Other additional advantages are obtained through the use of the present invention. Thus, the processing of the tree or trees can be started or stopped anywhere along the length of the trunk due to the capability of the lifting and lopping arms and movable feed roll units to be moved to their open position when desired. Additionally, the movable lifting and lopping arms 10 accomplishes both the initial pre-loading and dragging of the trunks, previously performed almost exclusively by physical labor, concurrently with the lopping and bucking of the trunks through the directed grasping of the top of the felled tree by the arms and initiation of the lopping from the top of the tree to proceed towards its foot.

Obviously, numerous modifications and variations of the present invention are possible in the light of the above teachings. Thus, the roll units 4 need not necessarily be fixed to the frame but can be affixed thereto by springs or turning mechanisms, as desired. Further, it is within the scope of the present invention to replace the two fixed roller configuration of the apparatus with a single fixed roll unit which is oriented with its axis being substantially horizontal and the roller surface being concave, the diameter of the center part of the fixed roller being less than the diameter of the ends. Separate power sources can be provided, when necessary, for moving the lifting and lopping arms and movable feed roll units, in lieu of the hydraulic cylinder described. It is therefore to be understood that within the scope of the intended claims the invention may be practiced otherwise than is specifically described herein.

What is claimed is:

1. Apparatus for lopping one or more felled trees in bulk and bucking and prestacking the same comprising: a frame adapted to be connected to one end of a boom; a pair of lifting and lopping arms pivotally mounted at their respective ends to said frame, said arms each having a lopping blade associated therewith, and being pivotally movable between an open position wherein said arms extend substantially downwardly to engage one or more tree trunks therebetween and a closed position where said arms are moved inwardly towards each other to suitably locate the one or more tree trunks for subsequent lopping and means for feeding the one or more tree trunks past said lopping blades including at least two movable feed rolls pivotally mounted to said frame slightly spaced from each other in the longitudinal tree trunk feeding direction, said feed rolls being pivotally movable between an open position and a closed tree trunk feeding position, and at least two fixed counter-rolls mounted to said frame slightly spaced from each other in the longitudinal tree trunk feeding direction, and wherein when the feed rolls are in their closed tree trunk feeding position the axes of rotation of said feed rolls and counter-rolls when viewed in the longitudinal tree trunk feeding direction mutually cross to define an enclosed feeding pocket whose configuration is adapted to conform to the one or more tree trunks being fed.

2. Apparatus as recited in claim 1, wherein each of said feed rolls is substantially aligned in substantially the same plane extending transversely to the feed direction with a respective one of said counter-rolls.

3. Apparatus as recited in claim 1 wherein said fixed rolls have mutually overlapping end portions and define axes of rotation which diverge downwardly with respect to each other.

4. Apparatus as recited in claim 1 wherein said frame includes a pair of downwardly extending legs defining between them a collection pocket.

5. Apparatus as recited in claim 4 wherein inwardly directed tongues are provided on the lower free ends of said frame legs defining a restricted throat area to said collection pocket.

6. Apparatus as recited in claim 4 wherein said frame includes a pair of substantially parallelly extending elongate pivot members, on respective ones of which said arms and said movable rolls are pivotally mounted and wherein said arms and movable rolls extend downwardly from said pivot members when in their respective open positions.

7. Apparatus as recited in claim 6 wherein each of said movable rolls include a turning arm pivotally journaled on a respective pivot member, and further including a hydraulic cylinder and an elongate spring member, said cylinder and spring member having ends connected to respective turning arms.

8. Apparatus as recited in claim 7 further including means for moving the movable rolls and lifting and lopping arms simultaneously between their respective open and closed positions comprising bracket elements interconnecting respective pairs of the movable rolls and lifting and lopping arms mounted on common pivot members, so that the hydraulic cylinder comprises means for pivotally moving both the movable rolls and the lifting and lopping arms.

9. Apparatus as recited in claim 8 wherein each of said bracket elements includes a flexible portion connected to the lifting and lopping arms.

10. Apparatus as recited in claim 6 further including a lopping blade frame having a lopping blade provided on the lower edge thereof, said lopping blade defining together with the lopping blades of said lifting and lopping arms a lopping blade pocket, said locking blade pocket being closed at its lower end by the lopping blades provided on said lifting and lopping arms and varying in size during movement of said lifting and lopping arms.

11. Apparatus as recited in claim 10 wherein said lopping blade provided on said lopping blade frame is arcuate in shape.

* * * * *